May 20, 1958

R. C. BAUMANN 2,835,548

SATELLITE STRUCTURE

Filed Aug. 1, 1957

INVENTOR
ROBERT C. BAUMANN

BY

ATTORNEYS

May 20, 1958  R. C. BAUMANN  2,835,548
SATELLITE STRUCTURE
Filed Aug. 1, 1957  3 Sheets-Sheet 2
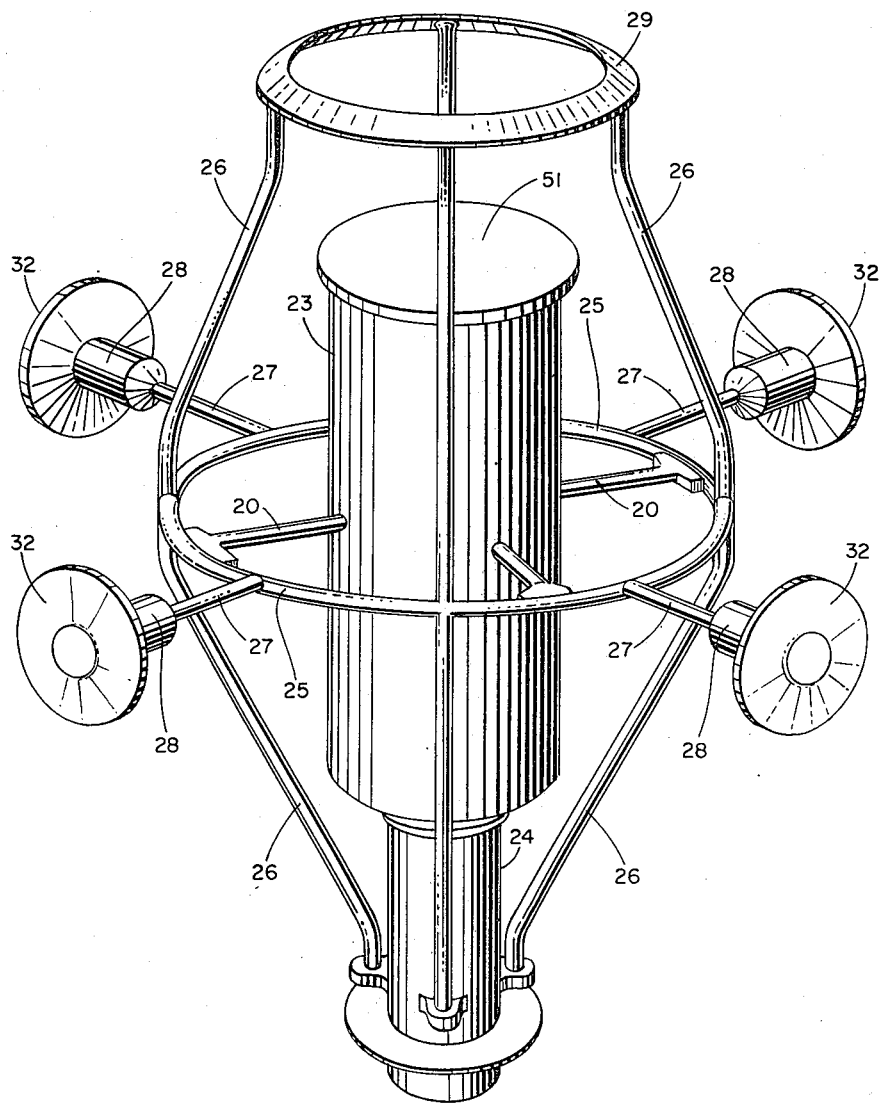
INVENTOR
ROBERT C. BAUMANN
BY
ATTORNEYS May 20, 1958 — R. C. BAUMANN — 2,835,548
SATELLITE STRUCTURE
Filed Aug. 1, 1957 — 3 Sheets-Sheet 3
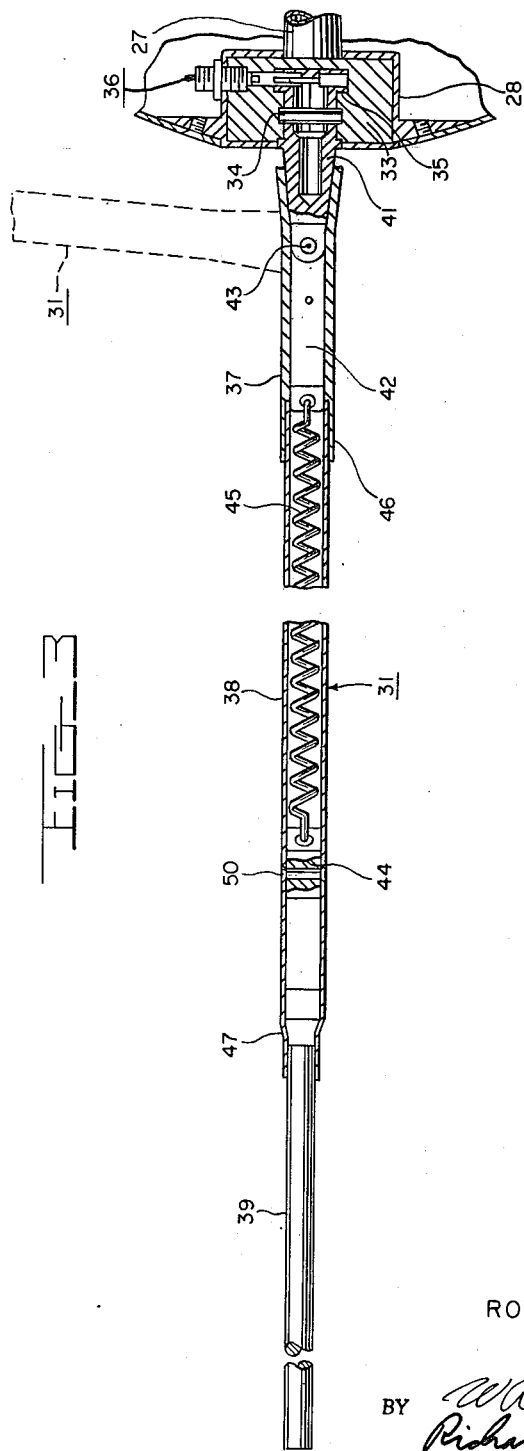
INVENTOR
ROBERT C. BAUMANN
BY
ATTORNEYS

United States Patent Office 2,835,548
Patented May 20, 1958

2,835,548

SATELLITE STRUCTURE

Robert C. Baumann, Alexandria, Va., assignor to the United States of America as represented by the Secretary of the Navy Application August 1, 1957, Serial No. 675,787

9 Claims. (Cl. 312—352)

(Granted under Title 35, U. S. Code (1952), sec. 266)

The invention described herein may be manufactured and used by or for the Government of the United States of America for governmental purposes without the payment of any royalties thereon or therefor.

The present invention relates to the design of earth satellites and more particularly to the outer shell structure of the satellite and the supporting members therein which carry the instruments.

Heretofore scientific explorations of the upper atmosphere in order to obtain a better understanding of the physical phenomena in these regions has been carried out by the use of gas filled balloons and by rockets carrying specific instruments. These explorations have been limited to certain areas of the upper atmosphere and to short periods of time for taking the desired data.

Earth satellites made according to the present invention can be fired into the upper atmosphere to encircle the earth and to obtain data throughout the whole area about the earth. Observations can be made of electromagnetic radiation from the sun which does not penetrate the earth's atmosphere, and to study incoming radiations and relate them to the affected regions of the atmosphere such as ozonosphere and the ionosphere. The satellite will further provide new and unprecedented opportunities for scientific measurements of the upper atmosphere and will increase the observable time for taking measurements and provide a more widespread test area. Also more intelligent information about the size and shape of the earth can be obtained by such a satellite.

It is therefore an object of the present invention to provide a satellite structure which can be fired into the upper atmosphere and remain for relatively long periods of time.

Another object is to provide a structure which is adapted to carry instruments into the upper atmosphere for upper atmosphere observation.

Yet another object is to provide a structure which can be easily assembled and disassembled.

Other and more specific objects of this invention will become apparent upon a careful consideration of the following detailed description when taken with the accompanying drawings, in which:

Fig. 2 is a side elevation view of the inner structure of the satellite;

Fig. 3 is a sectional view of the antenna which illustrates the mechanism which operates the antenna to permit folding.

Figure 1:
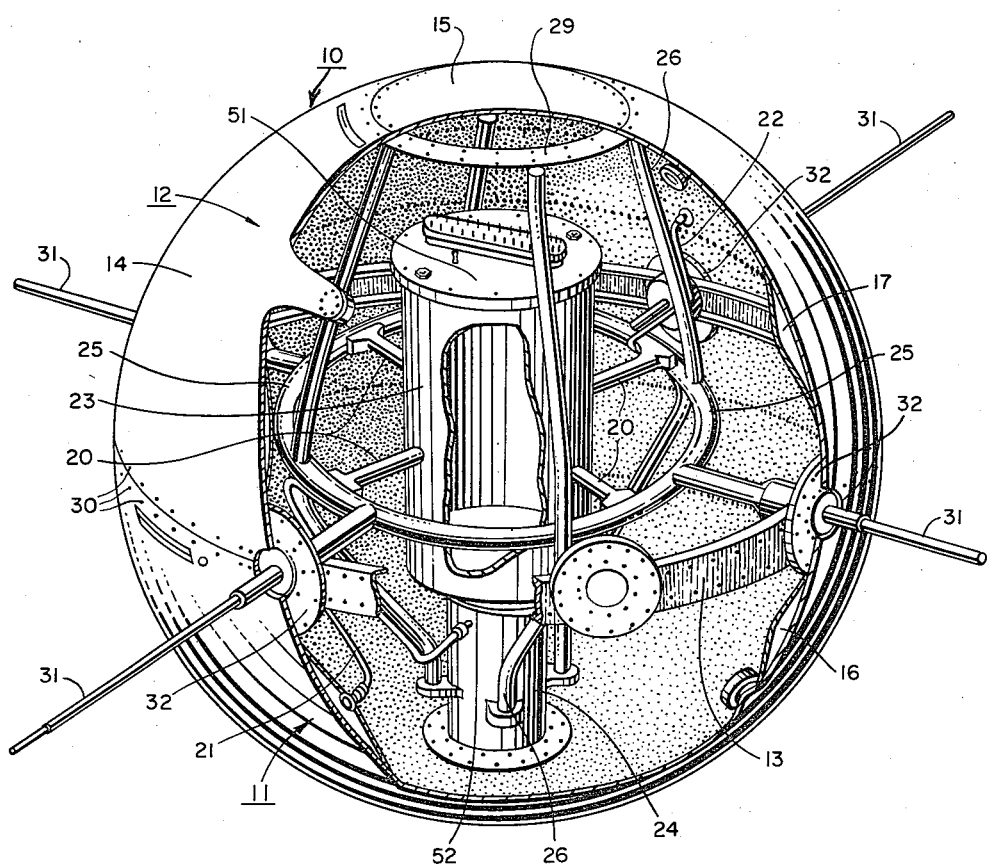
Fig. 1 is a plan view of the satellite which is cut away to illustrate the inner structure.

The present invention provides a spherical shell within which a supporting structure aids in maintaining the shape of the spherical shell and also provides easy access to the innermost part for securing and assembling the instruments. The inner structure has antennas connected thereto which are adapted to extend outwardly along the equator to provide the necessary function of sending and receiving signals.

Referring now to the drawings wherein like reference characters represent like parts throughout, the satellite structure 10, as illustrated, comprises a housing which has a lower hemispherical section 11 and an upper hemispherical section 12 which are fastened at the equator to a channeled structure 13, by rivets and/or screws as appropriate. The upper hemispherical section 12 is formed in two parts 14, 15 wherein the uppermost part 15 permits limited access to the inside thereof for adjusting the instruments and final assembly thereof. The housing is formed of magnesium or any other suitable material which will withstand the pressures and temperatures of the atmosphere within which the satellite structure travels, and in addition the rigorous vibration, acceleration and aerodynamic heating incurred during the ascending trajectory.

The lower and upper hemispherical housing sections are girdled on the inner surface respectively by pressure zones 16 and 17 formed by an annular band of metal similar to the housing and welded thereto. The band is somewhat rounded and so formed so as to afford equal strength to withstand pressures both internally and externally. The pressure zones have pressure lines 21 and 22 which extend therefrom and connect with a pressure gauge (not shown) in the inner structure. The pressure zones are adapted to withstand both positive and negative (vacuum) pressures. The zones are filled with unequal pressures for the purpose of determining if puncture occurs during the ascending trajectory and further to determine which of the hemispherical sections has been punctured in the event the shell is punctured during flight.

The housing has an inner supporting structure which comprises an inner cylindrical chamber 23 secured at the bottom by a low thermal conductivity support 52 of "Kel–F" or other suitable material, to a main support column 24 which is connected at the bottom to the inner surface of the lower hemispherical surface. Concentric with the cylindrical chamber is a tubular ring 25 which is connected to the chamber by four tubular rods 20 made of "Kel–F" or other suitable material with low thermal conductivity, said rods extending therefrom along equally spaced radii at the equator of the spherical shell. The tubular ring is supported vertically by four bow shaped tubular members 26 spaced 90 degrees apart with respect to a plane through the equator of the spherical shell. The bottom ends of members 26 are secured to the main support 24 by welding or any other suitable manner and the upper ends are likewise secured to an annular member 29 to which sections 14 and 15 of the upper hemispherical section are secured. The main support 24 is also designed to receive the satellite separation mechanism. Extending radially from the concentric ring 25 along radii in the equatorial plane are four tubular rods 27 spaced 90° apart and 45° with respect to members 26. Each of the rods terminate in an enlarged cylindrical tubular portion 28 which supports an antenna 31 and a flanged portion 32 on the end thereof that aids in supporting the shell structure at the equator. As can be seen by illustration in Fig. 1, the shell structure is also supported at the north and south poles by the supporting frame structure.

The flanged portion 32 is curved to fit along the inner surface of the shell structure which is secured thereto by suitable screws 30 or any other suitable means and the cylindrical end portion of the antenna supporting structure in adapted to receive the end of the antenna and an insulating member 33 by which the antennas are secured to the tubular end portions. The insulating members may be made of Teflon or any other suitable material which is cylindrical in shape and has a diameter such that it fits tightly into the cylindrical end piece. The insulating member is formed in two pieces and adapted to fit about the end of the antennas which is held thereto by a pin 34 and a rib 35 on the end of the antenna. A connector 36 makes contact with the antenna to provide connecting means through which signals may be sent or received and also to provide means for holding the insulating member and antennas in the cylindrical end piece 28.

The antennas are designed such that they may be folded at an acute angle with respect to the antenna support rods 27. The antennas are made in three sections 37, 38 and 39 of aluminum tubing having a wall thickness of 0.024 inch. The tubes provide a means by which suitable mechanism may be installed to permit folding and subsequent automatic return to a locked unfolded position as shown in Fig. 3. The mechanism includes a short stub end 41 which is secured to the cylindrical end pieces 28 by insulating member 33 and connector 36, and tapered on the other end to be received by a tapered end of antenna section 37. The stub end 41 is secured to an elongated cylindrical member 42 which is adapted to be inserted for free movement into the antenna end section 37 and pivotably connected to stub end 41 at 43. A fixed member 44 is secured in the outer end of section 38 by rivet 50 and a spring 45 is connected thereto and to the cylindrical member 42. The inner end of antenna section 38 is connected to the outer end of section 37 at 46 adjacent to cylindrical member 41 and the inner end of section 39 is secured at 47 to the outer end of antenna section 38 adjacent to the fixed member 44.

In order to position the antenna in its folded position, the antenna is pulled away from the spherical section until the inner tapered end of section 37 clears the pivot 43 which permits folding. During launching of the satellite the antennas will be in a folded position shown by dotted lines in Fig. 3 and resting upon suitable stops on the nose cone section, not shown, and upon release of the nose section, the spring 45 will pull the antennas into normal flight position as shown in Figs. 1 and 3. Such an arrangement affords protection for the antennas during the critical stages of launch as well as enabling the use of a relatively long antenna without modification to the launching vehicle.

In addition to the antennas equally spaced about the equator there are suitably spaced four microphones, a Lyman Alpha solar cell and a Lyman Alpha ion chamber. Further there are various gages and connections thereto from the shell structure such as erosion gages, temperature gages, pressure gages and any other attachment for suitable equipment.

The cylindrical chamber 23 is adapted for use as the power supply storage and for securing various instruments therein. These instruments do not constitute a part of the present invention, therefore, further discussion is not seen to be necessary. However, the top cover 51 for the cylindrical chamber provides the connections for most of the instruments in the chamber and is therefore designed to secure the connectors therein.

The internal structure, the internal cylindrical chamber and shell assembly are electro-plated with zinc, copper, silver and a coating of 0.00005 inch of gold to facilitate handling, reduce corrosion, and for thermal considerations. The outer surface of the magnesium sphere is further coated evaporatively with a silicon monoxide coating which has several underlying coatings of other metal substances as follows: a layer of chromium, a layer of silicon monoxide, and a layer of aluminum. The final silicon monoxide coating gives the desired thermal emissivity. These coatings are for the purpose of regulating, to some degree, the mean orbital temperature of the housing by setting the ratio between absorptivity and emissivity.

The above structure has been described for a satellite structure to be used in actual flights in the upper atmosphere. However, it is to be understood that applicant is not to be limited to the materials from which the structure is made since it is obvious that similar structures can be made of other materials. The materials from which the satellite structure is made will depend on the particular use to which it will be applied, that is, similar structures can be used for giving lectures, group discussions or even as a toy and will not require the particular materials for the structure as required for upper atmosphere flights.

Obviously many modifications and variations of the present invention are possible in the light of the above teachings. It is therefore to be understood that within the scope of the appended claims the invention may be practiced otherwise than as specifically described.

What is claimed is:

1. A satellite which comprises a thin shell spherical structure and an inner support structure, said inner support structure comprising a support column, a plurality of bow-shaped members and a first ring, all positioned concentrically about an axis through said spherical structure, said bow-shaped members being secured at one end to said support column and at the other end to said first ring, said support column and said first ring being secured to the inner surface of said spherical structure, a second ring secured to said bow-shaped members at the equator of said spherical structure and a plurality of radially extending members secured to said second ring and to the inner surface of said spherical structure at the equator.

2. A satellite as claimed in claim 1 wherein the ends of said plurality of radially extending members secured to said ring and to the inner surface of said spherical structure are adapted for mounting antennas that extend outwardly from said spherical structure, said antennas being adapted for pivotable movement for angularly positioning said antennas with respect to said mounting structure.

3. A satellite structure comprising an outer spherical structure and a supporting structure within said spherical structure, said supporting structure being formed of a plurality of bow-shaped members assembled about an axis of said spherical structure and secured respectively at opposite ends to a cylindrical chamber and a concentric ring each of which are secured to the inner surface of said spherical structure, and a ring secured to said bow-shaped members at points on a plane perpendicular to the axis about which said spherical structure is secured.

4. A satellite structure which comprises a thin shell spherical structure and a supporting structure within said spherical structure, said supporting structure comprising a plurality of bow-shaped members, a support column and a first ring, all assembled concentrically about an axis through said spherical structure perpendicular to a plane through the spherical section at the equator, said bow-shaped members being equally spaced and secured at one end to said support column and secured at the opposite end to said first ring, a second ring structure secured to said bow-shaped members along the plane at the equator, radially extending support members secured to said second ring structure about said bow-shaped members and to said support column, and other radially extending support members secured to said second ring structure about said bow-shaped members and to the inner surface of said spherical structure at the equator.

5. A satellite structure as claimed in claim 4 in which at least four bow-shaped members form a part of said supporting structure.

6. A satellite structure as claimed in claim 4 in which said spherical structure is formed by a plurality of sections.

7. A satellite structure as claimed in claim 4 in which said spherical structure is formed by one section from the equator and below and by two sections from the equator and above said equator, two of said sections being adapted to be secured at the equator to circularly extending channel sections and said two sections above said equator being adapted to be secured to said concentric ring of said supporting structure.

8. A satellite structure which comprises a thin shell three sectioned spherical structure and a supporting structure within said spherical structure, said supporting structure comprising at least four bow-shaped members, a support column and a first ring all assembled concentrically about an axis through said spherical structure perpendicular to a plane through the spherical structure at the equator, said bow-shaped members being equally spaced and secured at one end to said support column and secured at the opposite end to said first ring, said support column being secured to the inner surface of said spherical structure, a second ring structure secured to said bow-shaped members on a plane through the equator of said spherical structure, radially extending support members secured to said ring structure and to said support column on said plane, other radially extending support members secured to said ring structure at one end and having a flanged end at the other end adapted to be secured to the inner surface of said spherical surface at the equator thereof, said flanged end of said other radially extending support members being adapted to support antennas on the outer surface of said spherical structure.

9. A satellite structure as claimed in claim 8 wherein one of said sections forms a part of the shell structure from the equator and below and the other two sections form the surface above said equator, the section below the equator and one of the sections above the equator being adapted to be connected to circularly extending channel sections at the equator and the two sections above the equator being adapted to be connected to said first ring of said support structure.

References Cited in the file of this patent

UNITED STATES PATENTS

| | | |
|---|---|---|
| 731,394 | Terwilleger | June 16, 1903 |
| 766,643 | Miniszewski | Aug. 2, 1904 |